United States Patent
Chung et al.

(10) Patent No.: US 11,168,763 B2
(45) Date of Patent: Nov. 9, 2021

(54) CYCLOID SPEED REDUCER

(71) Applicant: Delta Electronics, Inc., Taoyuan (TW)

(72) Inventors: Chi-Wen Chung, Taoyuan (TW); En-Yi Chu, Taoyuan (TW); Hung-Wei Lin, Taoyuan (TW); Ming-Li Tsao, Taoyuan (TW); Ching-Hsiung Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 137 days.

(21) Appl. No.: 16/728,505

(22) Filed: Dec. 27, 2019

(65) Prior Publication Data

US 2020/0132166 A1  Apr. 30, 2020

Related U.S. Application Data

(63) Continuation-in-part of application No. 15/964,362, filed on Apr. 27, 2018, now Pat. No. 10,520,062.
(Continued)

(30) Foreign Application Priority Data

Apr. 11, 2018 (TW) .................................. 107112454
Aug. 30, 2019 (CN) .......................... 201910820865.5

(51) Int. Cl.
*F16H 1/32* (2006.01)
*F16H 55/34* (2006.01)
*F16H 57/022* (2012.01)

(52) U.S. Cl.
CPC ............... *F16H 1/32* (2013.01); *F16H 55/34* (2013.01); *F16H 2001/325* (2013.01)

(58) Field of Classification Search
CPC ........... F16H 1/32; F16H 55/34; F16H 57/022
See application file for complete search history.

(56) References Cited

U.S. PATENT DOCUMENTS 3,994,187 A * 11/1976 Milenkovic ............... F16H 1/32
                                                                475/168
8,403,789 B2 * 3/2013 Janek ..................... F16H 57/082
                                                                475/116
(Continued)

FOREIGN PATENT DOCUMENTS

CN         2522672 Y    11/2002
CN       104728351 A     6/2015
(Continued)

*Primary Examiner* — Tinh Dang
(74) *Attorney, Agent, or Firm* — Kirton McConkie; Evan R. Witt

(57) ABSTRACT

A two-stage cycloid speed reducer comprises two rotating disc assemblies. Each rotating disc assembly comprises two cycloid discs. In other words, the cycloid speed reducer has four cycloid discs to be in contact with the corresponding rollers. Consequently, the load withstood by each cycloid disc is reduced. Since the cycloid speed reducer has stronger structural strength, the cycloid speed reducer can be applied to the high-load circumstance. Moreover, an eccentric assembly of the eccentric device includes a plurality of eccentric cylinders. The eccentric cylinders are disposed within the axle holes of the corresponding cycloid discs. Due to the eccentric cylinders, the eccentric direction of two cycloid discs is opposite to the eccentric direction of the other two cycloid discs. Consequently, it is not necessary to install an additional weight compensation device in the cycloid speed reducer to compensate the dynamic equilibrium. Moreover, the cycloid speed reducer can be assembled easily.

12 Claims, 16 Drawing Sheets

Related U.S. Application Data

(60) Provisional application No. 62/793,672, filed on Jan. 17, 2019, provisional application No. 62/500,641, filed on May 3, 2017.

(56) References Cited

U.S. PATENT DOCUMENTS

2007/0072727 A1* 3/2007 Nohara .................. F16H 1/32
                                                        475/178
2019/0136946 A1* 5/2019 Rey ..................... B62D 5/0421

FOREIGN PATENT DOCUMENTS

| | | |
|---|---|---|
| CN | 104074930 B | 8/2016 |
| CN | 209539936 U | 10/2019 |
| DE | 102013020363 A1 | 7/2014 |
| JP | S4924260 B1 | 6/1974 |
| JP | H02138538 A | 5/1990 |
| JP | H0771540 A | 3/1995 |
| TW | 201843403 A | 12/2018 |

* cited by examiner

CYCLOID SPEED REDUCER

CROSS-REFERENCE TO RELATED APPLICATION

This application claims the benefit of U.S. Provisional Application No. 62/793,672, filed on Jan. 17, 2019 and entitled "SPEED REDUCER". This application claims priority to China Patent Application No. 201910820865.5 filed on Aug. 30, 2019. This application is also a continuation-in-part application of U.S. application Ser. No. 15/964,362 filed on Apr. 27, 2018, which claims the benefit of U.S. Provisional Application No. 62/500,641 filed on May 3, 2017, and claims priority to Taiwan Patent Application No. 107112454 filed on Apr. 11, 2018. The entireties of the above-mentioned patent applications are incorporated herein by reference for all purposes.

FIELD OF THE INVENTION

The present disclosure relates to a speed reducer, and more particularly to a cycloid speed reducer with high rigidness and capable of achieving dynamic equilibrium.

BACKGROUND OF THE INVENTION

Generally, a motor is operated at a high speed and a low torsion force. In other words, it is difficult to use the motor to drive a large-sized load. For allowing the motor to drive a heavy object, a speed reducer is used for reducing the rotating speed of the motor and increasing the torsion force.

Conventionally, the speed reducers are classified into several types, including rotary vector (RV) reducers, harmonic drive reducers and cycloid speed reducers. For example, the RV-E series reducer is a two-stage speed reducer produced by Nabtesco. The RV-E series reducer comprises a first speed reduction stage with a spur gear and a second speed reduction stage with an epicyclic gear. The gears of the first speed reduction stage and the second speed reduction stage are made of metallic material. The RV-E series reducer is a two-stage reduction design to reduce vibration and inertia while increasing ratio capabilities. The RV-E series reducer provides high-end performance in highly rigidity and high reduction ratio configurations, and the rolling contact elements of the RV-E series reducer have high efficiency and long lifespan. However, since the RV-E series reducer has larger volume and weight and has many components, the process of assembling the RV-E series reducer is complicated and the cost of the RV-E series reducer is high.

The harmonic drive reducer comprises a wave generator, a flexible gear and a rigid gear. The elastic deformation of the flexible gear can be controlled to result in a pushing action so as to transmit motion and power of mechanical transmission. The harmonic drive reducer has smaller size, lighter weight and higher precision when compared with the RV reducer. However, since the rigidity of the flexible gear of the harmonic drive reducer is low, the harmonic drive reducer is unable to withstand high impact and has a problem of causing teeth difference friction. In other words, the use life of the harmonic drive reducer is shorter.

Conventionally, a cycloid speed reducer comprises an eccentric shaft and two cycloid discs. Each of the two cycloid discs comprises at least one tooth. Moreover, the two cycloid discs are linked with a power input shaft and a power output shaft, respectively. During operations of the cycloid speed reducer, one cycloid disc is rotated with the power input shaft through the eccentric shaft, and the power output shaft is rotated with the other cycloid disc. Through the corresponding teeth, the two cycloid discs are correspondingly rotated. The conventional cycloid speed reducer has many benefits such as high transmission ratio, compact structure and high transmission efficiency. However, in case that the conventional cycloid speed reducer is applied to a high-load circumstance, the two cycloid discs of the conventional cycloid speed reducer have to withstand high load. If the cycloid discs have insufficient structural strength, the cycloid discs are possibly damaged and thus the cycloid speed reducer is abnormal. Moreover, because of the eccentric shaft, the rotation of the conventional cycloid speed reducer is deflected in a specified direction when the cycloid speed reducer is operated. For compensating the dynamic equilibrium, the conventional cycloid speed reducer is additionally equipped with a weight compensation device. If the dynamic equilibrium is not effectively compensated, the conventional cycloid speed reducer generates obvious vibration.

Therefore, there is a need of providing a cycloid speed reducer with the characteristics of a RV reducer and a harmonic drive reducer and capable of achieving the high rigidness, the easy assembling process and the dynamic equilibrium in order to the overcome the above drawbacks.

SUMMARY OF THE INVENTION

An object of the present disclosure provides a cycloid speed reducer. By the cycloid speed reducer of the present disclosure, the problems of the conventional RV reducer (e.g., high volume, high weight, complicated assembling process and high cost) and the problems of the conventional harmonic drive reducer (e.g., unable to withstand high impact and causing the teeth difference friction) will be overcome. In addition, the cycloid speed reducer of the present disclosure is capable of achieving the high rigidness, the easy assembling process and the dynamic equilibrium.

In accordance with an aspect of the present disclosure, a cycloid speed reducer is provided. The cycloid speed reducer includes an eccentric device, a first roller assembly, a second roller assembly, a first rotating disc assembly, a second rotating disc assembly and at least one connecting element. The eccentric device comprises a rotating shaft and an eccentric assembly. The rotating shaft is rotatable. The eccentric assembly is eccentrically fixed on the rotating shaft and arranged between a first end and a second end of the rotating shaft. The eccentric assembly is driven by the rotating shaft to eccentrically rotate relative to an axle center of the rotating shaft. The first roller assembly includes a first wheel disc and a plurality of first rollers. The plurality of first rollers are disposed on the first wheel disc. The second roller assembly includes a second wheel disc and a plurality of second rollers. The plurality of second rollers are disposed on the second wheel disc. The first rotating disc assembly is disposed on the eccentric assembly and rotated with the eccentric assembly, and comprises two cycloid discs arranged adjacent to each other. Each of the two cycloid discs of the first rotating disc assembly comprises at least one outer tooth and at least one perforation. The at least one outer tooth is in contact with the corresponding first roller of the plurality of first rollers. The second rotating disc assembly is disposed on the eccentric assembly and rotated with the eccentric assembly, and comprises two cycloid discs arranged adjacent to each other. Each of the two cycloid discs of the second rotating disc assembly comprises at least one outer tooth and at least one perforation. The at least one outer tooth is in contact with the corresponding second roller of the plurality of second rollers. The perforations of the first rotating disc assembly and the perforations of the second rotating disc assembly are aligned with each other. The at least one connecting element is penetrated through the perforations of the two cycloid discs of the first rotating disc assembly and the perforations of the two cycloid discs of the second rotating disc assembly. The diameters of the portions of the connecting element penetrated through the corresponding perforations are equal to each other. The diameter of the perforations of one of the two cycloid discs of the first rotating disc assembly and the diameter of the perforations of one of the two cycloid discs of the second rotating disc assembly are equal to the diameter of the connecting element, and the diameter of the perforations of the other of the two cycloid discs of the first rotating disc assembly and the diameter of the perforations of the other of the two cycloid discs of the second rotating disc assembly are greater than the diameter of the connecting element.

In accordance with another aspect of the present disclosure, a cycloid speed reducer is provided. The cycloid speed reducer comprises an eccentric device, a first roller assembly, a second roller assembly, a first rotating disc assembly, a second rotating disc assembly and at least one connecting element. The eccentric device comprises a rotating shaft and an eccentric assembly. The rotating shaft is rotatable. The eccentric assembly is eccentrically fixed on the rotating shaft and arranged between a first end and a second end of the rotating shaft. The eccentric assembly is driven by the rotating shaft to eccentrically rotate relative to an axle center of the rotating shaft. The first roller assembly includes a first wheel disc and a plurality of first rollers. The plurality of first rollers are disposed on the first wheel disc. The second roller assembly includes a second wheel disc and a plurality of second rollers. The plurality of second rollers are disposed on the second wheel disc. The first rotating disc assembly is disposed on the eccentric assembly and rotated with the eccentric assembly, and comprises a first outer cycloid disc and a first inner cycloid disc. The first outer cycloid disc and the first inner cycloid disc are arranged adjacent to each other. The first outer cycloid disc comprises at least one first outer tooth and at least one first perforation. The first inner cycloid disc includes at least one second outer tooth and at least one second perforation. The at least one first outer tooth and the at least one second outer tooth are in contact with the corresponding first roller of the plurality of first rollers, respectively. The second rotating disc assembly is disposed on the eccentric assembly and rotated with the eccentric assembly, and comprises a second inner cycloid disc and a second outer cycloid disc. The second inner cycloid disc and the second outer cycloid disc are arranged adjacent to each other. The second inner cycloid disc comprises at least one third outer tooth and at least one third perforation. The second outer cycloid disc comprises at least one fourth outer tooth and at least one fourth perforation. The at least one third outer tooth and the at least one fourth outer tooth are in contact with the corresponding second roller of the plurality of second rollers, respectively. The at least one first perforation, the corresponding second perforation, the corresponding third perforation and the corresponding fourth perforation are aligned with each other. The at least one connecting element is penetrated through the at least one first perforation, the corresponding second perforation, the corresponding third perforation and the corresponding fourth perforation. The at least one connecting element is in close contact with inner walls of the at least one first perforation, the corresponding second perforation, the corresponding third perforation and the corresponding fourth perforation. The diameter of the second perforation and the diameter of the third perforation are equal to each other. The diameter of the first perforation and the diameter of the fourth perforation are equal to each other. The diameter of the second perforation and the diameter of the third perforation are greater than the diameter of the first perforation and the diameter of the fourth perforation.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
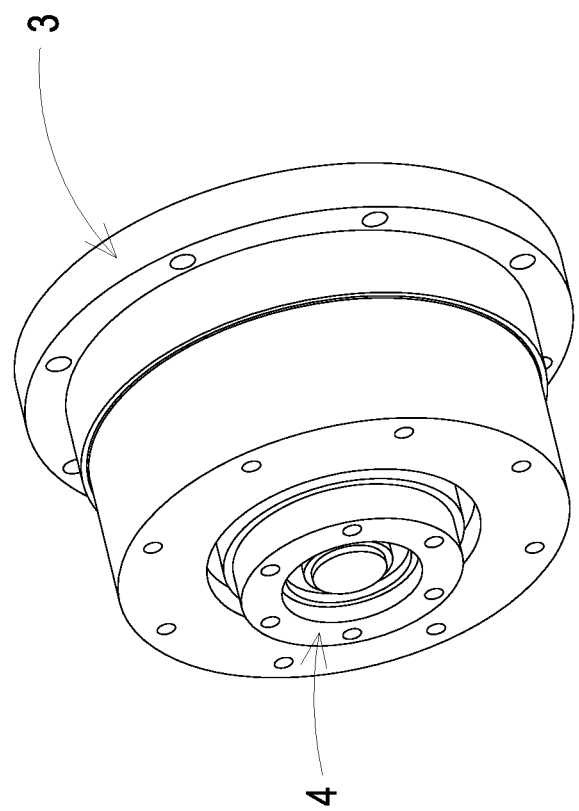
FIG. 1 is a schematic assembled view illustrating a cycloid speed reducer according to a first embodiment of the present disclosure.
Figure 2A:
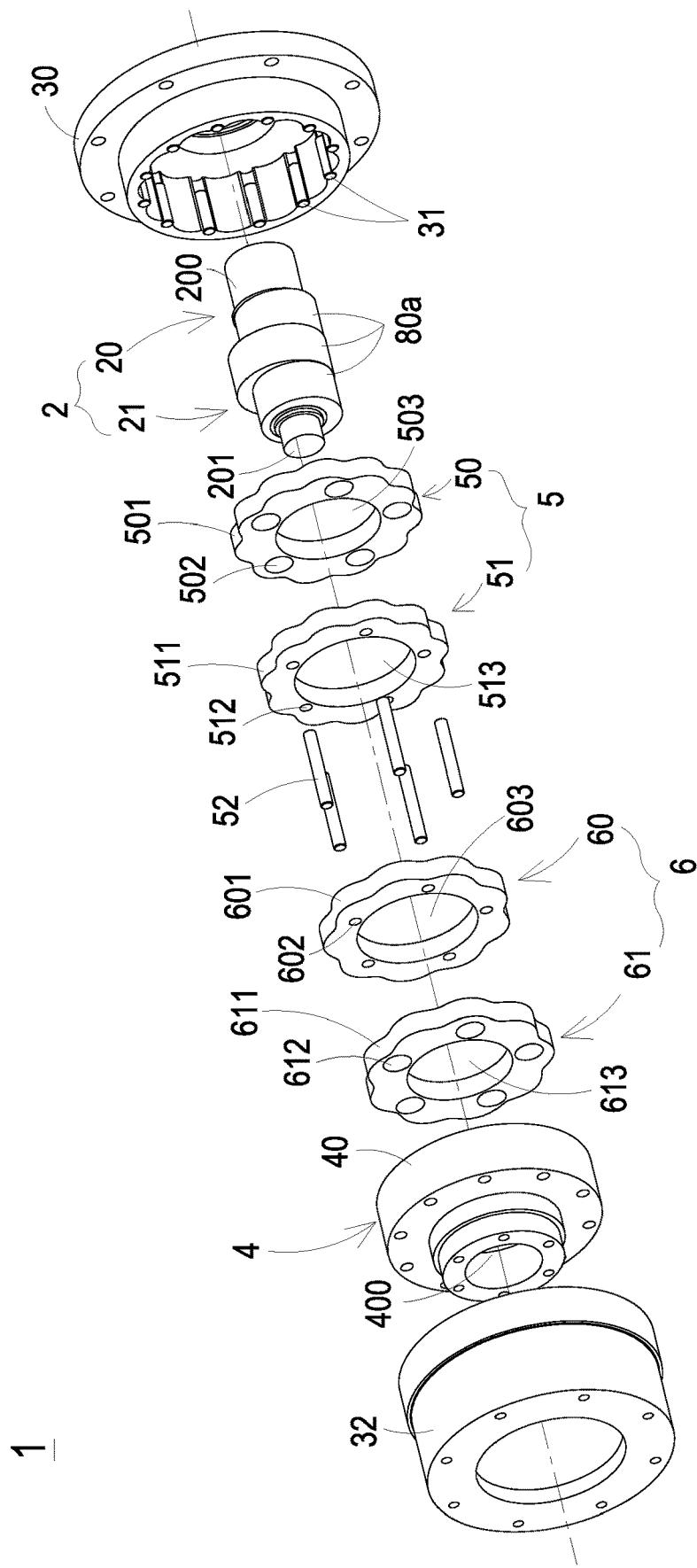
FIG. 2A is a schematic exploded view illustrating the cycloid speed reducer as shown in FIG. 1 and taken along a viewpoint.
Figure 2B:
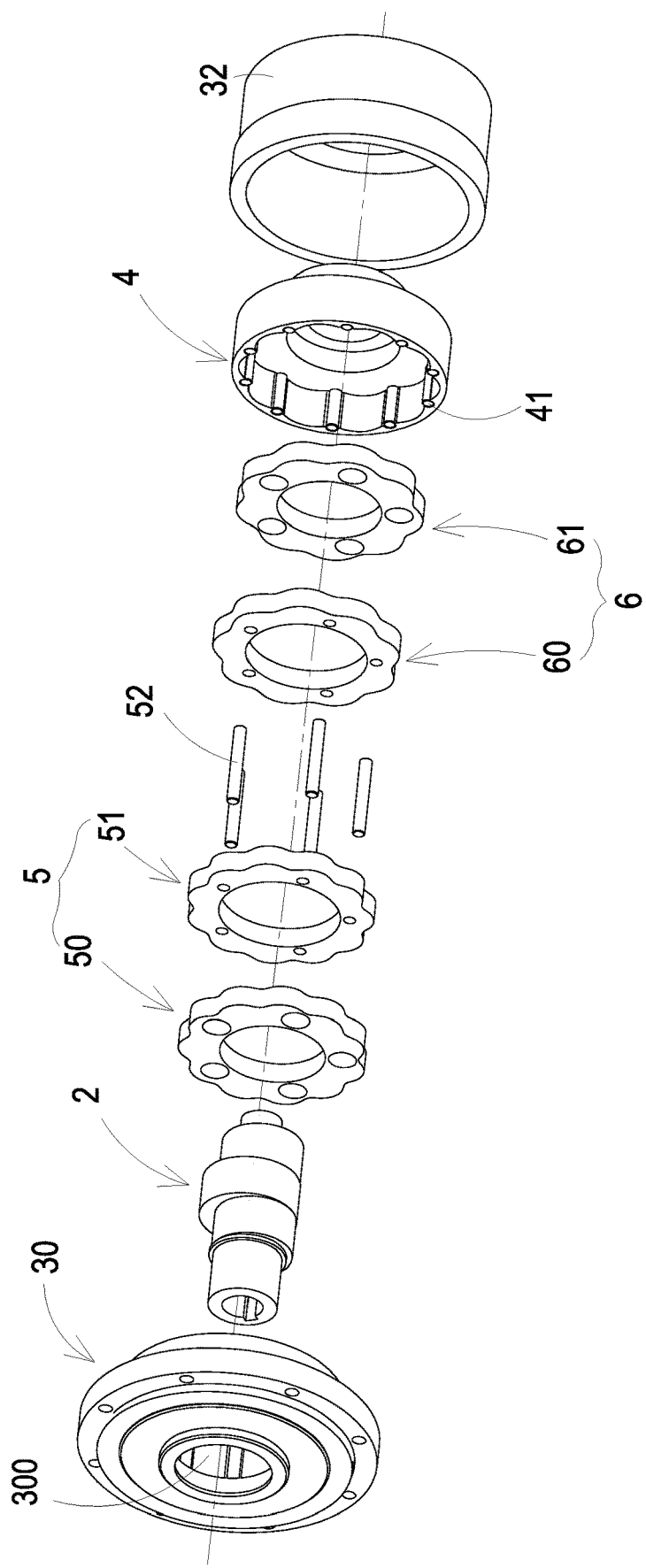
FIG. 2B is a schematic exploded view illustrating the cycloid speed reducer as shown in FIG. 1 and taken along another viewpoint.
Figure 2C:
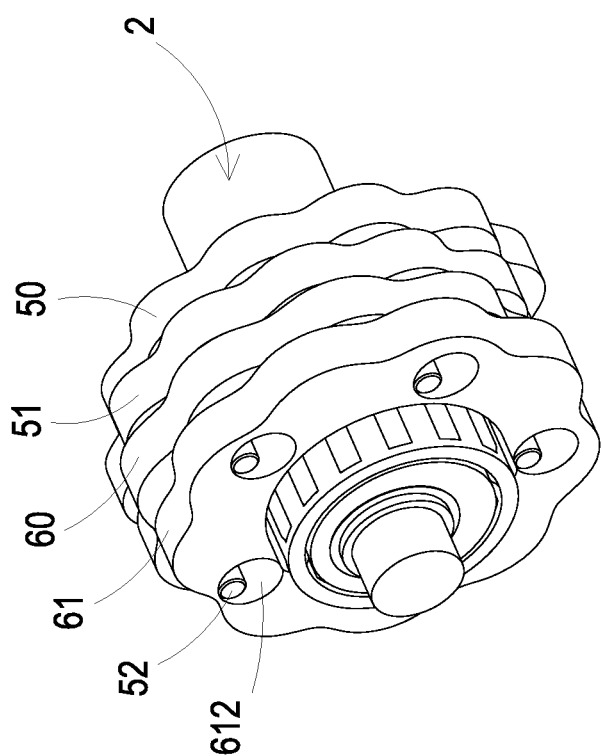
FIG. 2C is a schematic perspective view illustrating the combination of an eccentric device, a first rotating disc assembly and a second rotating disc assembly of the cycloid speed reducer as shown in FIG. 1.
Figure 2D:
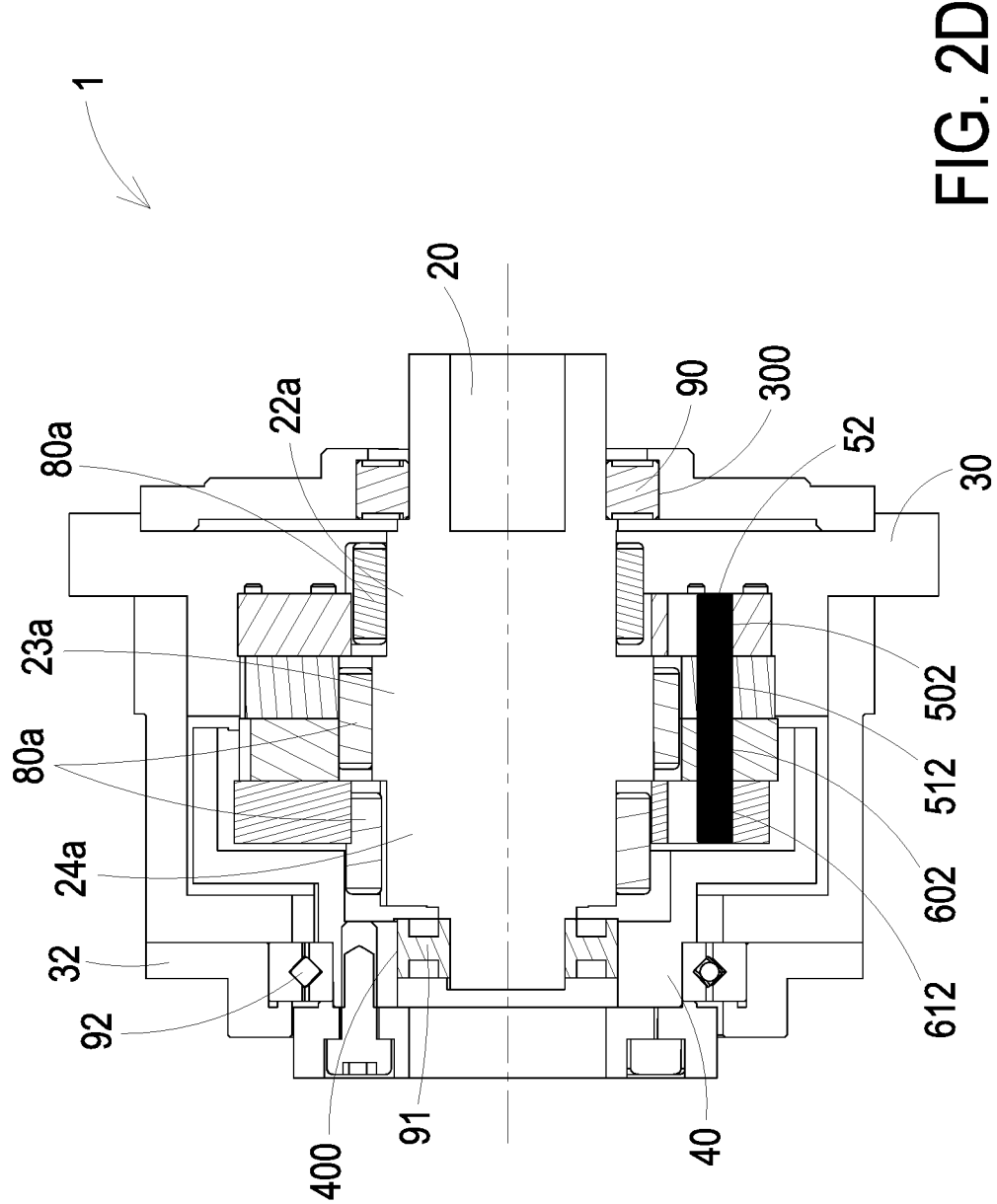
FIG. 2D is a schematic cross-sectional view illustrating the cycloid speed reducer as shown in FIG. 1.
Figure 2E:
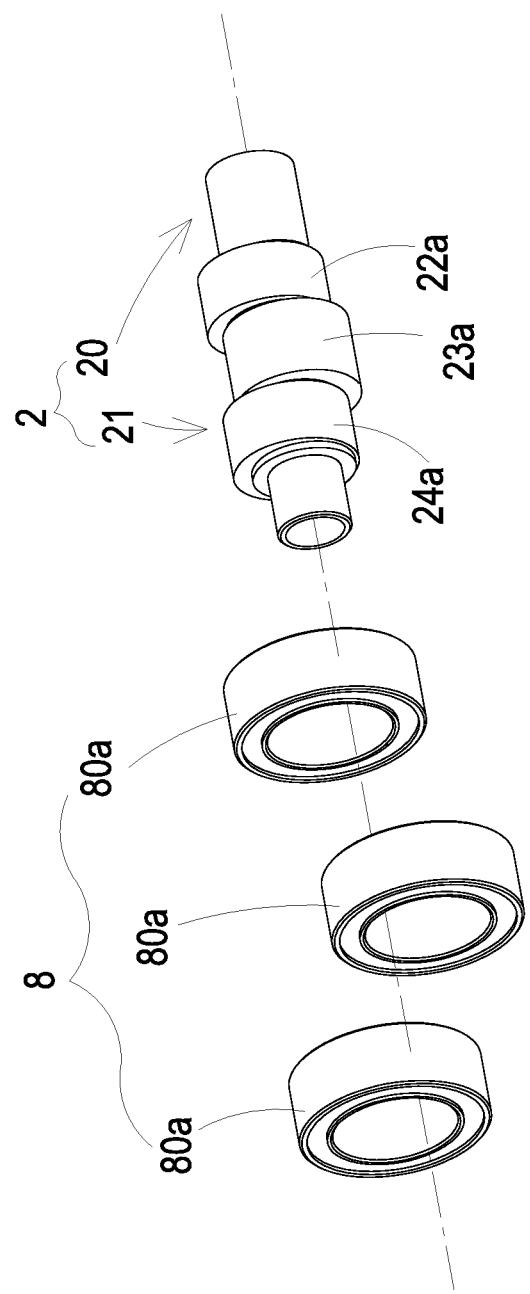
FIG. 2E is a schematic exploded view illustrating the relationships between the eccentric device and a bearing set in the cycloid speed reducer as shown in FIG. 2A.
Figure 2F:
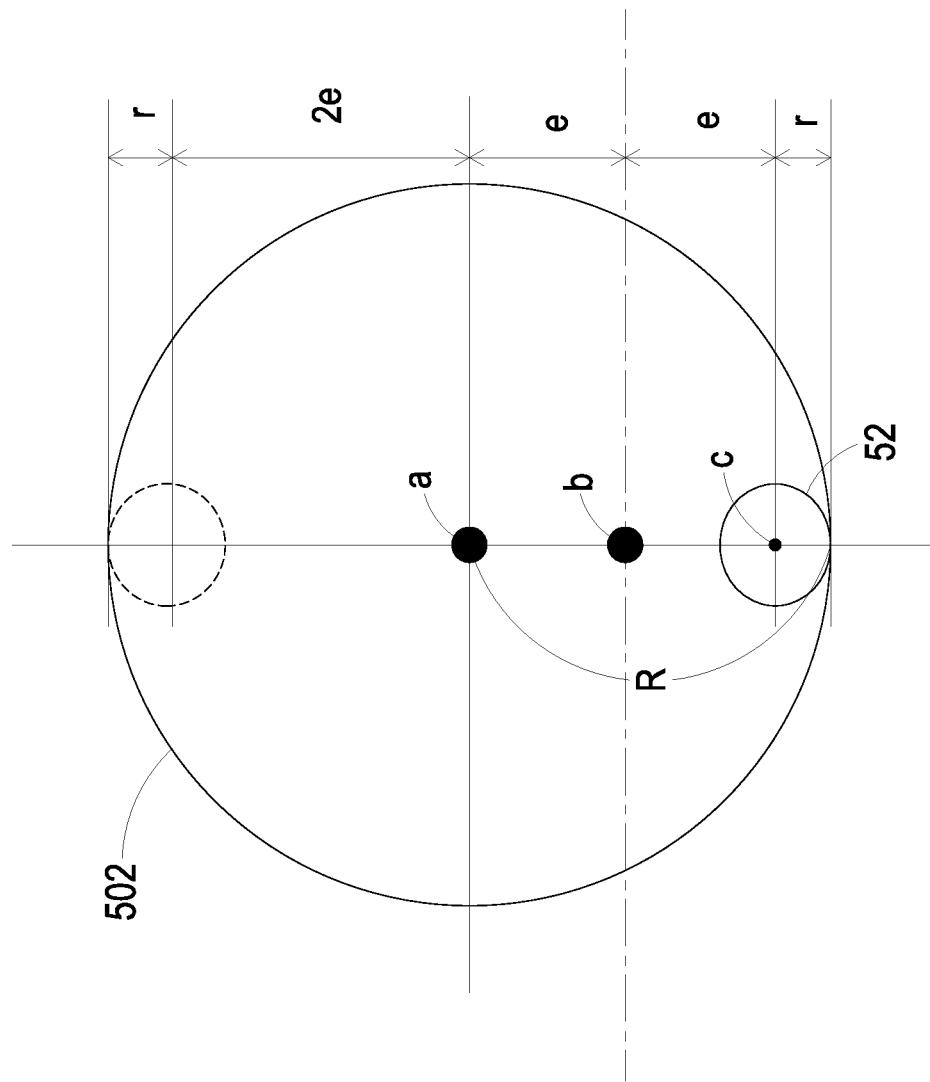
FIG. 2F is a schematic cross-sectional view illustrating the sizes and relationships between the first perforation of the first outer cycloid disc and the connecting element of the cycloid speed reducer as shown in FIG. 1.

Please refer to FIGS. 1, 2A, 2B, 2C, 2D, 2E and 2F. FIG. 1 is a schematic assembled view illustrating a cycloid speed reducer according to a first embodiment of the present disclosure. FIG. 2A is a schematic exploded view illustrating the cycloid speed reducer as shown in FIG. 1 and taken along a viewpoint. FIG. 2B is a schematic exploded view illustrating the cycloid speed reducer as shown FIG. 1 and taken along another viewpoint. FIG. 2C is a schematic perspective view illustrating the combination of an eccentric device, a first rotating disc assembly and a second rotating disc assembly of the cycloid speed reducer as shown in FIG. 1. FIG. 2D is a schematic cross-sectional view illustrating the cycloid speed reducer as shown in FIG. 1. FIG. 2E is a schematic exploded view illustrating the relationships between the eccentric device and a bearing set in the cycloid speed reducer as shown in FIG. 2A. FIG. 2F is a schematic cross-sectional view illustrating the sizes and relationships between the first perforation of the first outer cycloid disc and the connecting element of the cycloid speed reducer as shown in FIG. 1. The cycloid speed reducer 1 can be applied to motors, machine tools, robotic arms, automobiles, motorcycles or other power assisting devices in order to provide a speed reducing function.

In this embodiment, the cycloid speed reducer 1 is a two-stage cycloid speed reducer. The cycloid speed reducer 1 comprises an eccentric device 2, a first roller assembly 3, a second roller assembly 4, a first rotating disc assembly 5, a second rotating disc assembly 6 and at least one connecting element 52.

The eccentric device 2 receives an input power from a motor (not shown). In response to the input power, the eccentric device 2 is driven to rotate. In an embodiment, the eccentric device 2 comprises a rotating shaft 20 and an eccentric assembly 21. In response to the input power from the motor, the rotating shaft 20 is rotated. The rotating shaft 20 has a first end 200 and a second end 201, which are opposed to each other. The eccentric assembly 21 is eccentrically fixed on the rotating shaft 20. That is, the rotating center of the eccentric assembly 21 is not the axle center of the rotating shaft 20. The eccentric assembly 21 is arranged between the first end 200 and the second end 201 of the rotating shaft 20. As the rotating shaft 20 is rotated, the eccentric assembly 21 is eccentrically rotated relative to the axle center of the rotating shaft 20. In an embodiment, the eccentric assembly 21 comprises a plurality of eccentric cylinders. These eccentric cylinders are eccentrically fixed on the rotating shaft 20. Moreover, the eccentric directions of every two adjacent eccentric cylinders are opposite.

The first roller assembly 3 comprises a first wheel disc 30 and a plurality of first rollers 31. The first wheel disc 30 is a circular disc structure or a hollow cylindrical structure that is made of metallic material or alloy. Moreover, a first bearing 90 (see FIG. 2D) is disposed within a central hole 300 of the first wheel disc 30. The central hole 300 is located at the geometric center of the first wheel disc 30. An example of the first bearing 90 includes but is not limited to a ball bearing, a needle bearing or an oil-retaining bearing. Through the first bearing 90, the rotating shaft 20 is partially accommodated within the central hole 300 of the first wheel disc 30. Consequently, the first end 200 and the second end 201 of the rotating shaft 20 are located at two opposite sides of the first wheel disc 30. Preferably but not exclusively, the plurality of first rollers 31 are cylindrical posts, which are made of metallic material or alloy. Moreover, the plurality of first rollers 31 are circumferentially and discretely arranged on the first wheel disc 30 at regular intervals. Moreover, the plurality of first rollers 31 and the second end 201 of the rotating shaft 20 are at the same side with respect to the first wheel disc 30. In this embodiment, the first roller assembly 3 is not rotated about the axle center of the rotating shaft 20. That is, the first wheel disc 30 and the plurality of first rollers 31 are not rotated about the axle center of the rotating shaft 20. However, the plurality of first rollers 31 are rotatable about their own axles (i.e., self-rotation).

In some embodiments, the first roller assembly 3 further comprises a casing 32. The casing 32 is assembled with the first wheel disc 30 and has a hollow structure. After the eccentric device 2, the first roller assembly 3, the second roller assembly 4, the first rotating disc assembly 5, the second rotating disc assembly 6 and the at least one connecting element 52 are assembled and combined together as the cycloid speed reducer 1 (see FIG. 1), a portion of the eccentric device 2, the second roller assembly 4, the first rotating disc assembly 5, the second rotating disc assembly 6 and the at least one connecting element 52 are accommodated within the hollow structure of the casing 32. Alternatively, portions of the eccentric device 2, the second roller assembly 4 and the second rotating disc assembly 6 are accommodated within the hollow structure of the casing 32, and the first rotating disc assembly 5 is accommodated within the first wheel disc 30 (see FIG. 1).

The second roller assembly 4 comprises a second wheel disc 40 and a plurality of second rollers 41. The second wheel disc 40 is a circular disc structure or a hollow cylindrical structure that is made of metallic material or alloy. Moreover, a second bearing 91 (see FIG. 2D) is disposed within a central hole 400 of the second wheel disc 40. The central hole 400 is located at the geometric center of the second wheel disc 40. An example of the second bearing 91 includes but is not limited to a ball bearing, a needle bearing or an oil-retaining bearing. Through the second bearing 91, the rotating shaft 20 is partially accommodated within the central hole 400 of the second wheel disc 40. Consequently, the first end 200 and the second end 201 of the rotating shaft 20 are located at two opposite sides of the second wheel disc 40. Preferably but not exclusively, the plurality of second rollers 41 are cylindrical posts, which are made of metallic material or alloy. The plurality of second rollers 41 are circumferentially and discretely arranged on the second wheel disc 40 at regular intervals. In this embodiment, the second roller assembly 4 can be rotated about the axle center of the rotating shaft 20. That is, the second wheel disc 40 and the plurality of second rollers 41 can be rotated about the axle center of the rotating shaft 20. Moreover, the second wheel disc 40 is a power output component of the cycloid speed reducer 1 that generates the output power. In some embodiments, the plurality of second rollers 41 are rotatable about their own axles.

In an embodiment, the cycloid speed reducer 1 further comprises a third bearing 92 (see FIG. 2D). The third bearing 92 is disposed within the hollow structure of the casing 32 and arranged between the casing 32 and the second wheel disc 40. Consequently, the second roller assembly 4 is rotatable within the casing 32.

The first rotating disc assembly 5 is disposed on the eccentric assembly 21 and rotated with the eccentric assembly 21. The first rotating disc assembly 5 comprises a first outer cycloid disc 50 and a first inner cycloid disc 51. The first outer cycloid disc 50 is arranged adjacent to the first wheel disc 30. Moreover, the first outer cycloid disc 50 comprises at least one first outer tooth 501 and at least one first perforation 502. The at least one first outer tooth 501 is protruded from an outer periphery of the first outer cycloid disc 50. Moreover, the at least one first outer tooth 501 is in contact with the at least one first roller 31. The first inner cycloid disc 51 is arranged adjacent to the first outer cycloid disc 50. Moreover, the first inner cycloid disc 51 and the first wheel disc 30 are located at two opposite sides of the first outer cycloid disc 50. The first inner cycloid disc 51 comprises at least one second outer tooth 511 and at least one second perforation 512. The at least one second outer tooth 511 is protruded from an outer periphery of the first inner cycloid disc 51. Moreover, the at least one second outer tooth 511 is in contact with the at least one first roller 31. In this embodiment, the first outer cycloid disc 50 and the first inner cycloid disc 51 are disposed on two eccentric cylinders of the eccentric assembly 21, wherein the eccentric directions of the two eccentric cylinders are opposite. In other words, the eccentric directions of the first outer cycloid disc 50 and the first inner cycloid disc 51 are opposite.

The second rotating disc assembly 6 is disposed on the eccentric assembly 21 and rotated with the eccentric assembly 21. The second rotating disc assembly 6 comprises a second inner cycloid disc 60 and a second outer cycloid disc 61. The second inner cycloid disc 60 is arranged between the first inner cycloid disc 51 and the second wheel disc 40. The second inner cycloid disc 60 comprises at least one third outer tooth 601 and at least one third perforation 602. The at least one third outer tooth 601 is protruded from an outer periphery of the second inner cycloid disc 60. Moreover, the at least one third outer tooth 601 is in contact with the at least one second roller 41. The second outer cycloid disc 61 is arranged between the second inner cycloid disc 60 and the second wheel disc 40. The second outer cycloid disc 61 comprises at least one fourth outer tooth 611 and at least one fourth perforation 612. The at least one fourth outer tooth 611 is protruded from an outer periphery of the second outer cycloid disc 61. Moreover, the at least one fourth outer tooth 611 is in contact with the at least one second roller 41. In this embodiment, the second inner cycloid disc 60 and the second outer cycloid disc 61 are disposed on two eccentric cylinders of the eccentric assembly 21, wherein the eccentric directions of the two eccentric cylinders are opposite. In other words, the eccentric directions of the second inner cycloid disc 60 and the second outer cycloid disc 61 are opposite.

In this embodiment, the at least one first perforation 502, the at least one second perforation 512, the at least one third perforation 602 and the at least one fourth perforation 612 are aligned with each other. Moreover, the number of the at least one first perforation 502, the number the at least one second perforation 512, the number of the at least one third perforation 602 and the number of at least one fourth perforation 612 are equal to the number of the at least one connecting element 52. The connecting element 52 is arranged between the first outer cycloid disc 50 and the second outer cycloid disc 61. The connecting element 52 is penetrated through the corresponding first perforation 502, the corresponding second perforation 512, the corresponding third perforation 602 and the corresponding fourth perforation 612. Moreover, the diameter of the second perforation 512 and the diameter of the third perforation 602 are equal to the diameter of the connecting element 52 (including the tolerance), and the diameter of the first perforation 502 and the diameter of the fourth perforation 612 are equal to each other and greater than the diameter of the connecting element 52. After the connecting element 52 is penetrated through the corresponding first perforation 502, the corresponding second perforation 512, the corresponding third perforation 602 and the corresponding fourth perforation 612, the first inner cycloid disc 51 and the second inner cycloid disc 60 are connected with each other through the connecting element 52 because the diameter of the second perforation 512 and the diameter of the third perforation 602 are equal to the diameter of the connecting element 52. Moreover, since the diameter of the first perforation 502 and the diameter of the fourth perforation 612 are greater than the diameter of the connecting element 52, the connecting element 52 is in contact with a portion of the inner wall of the first perforation 502 and a portion of the inner wall of the fourth perforation 612.

As mentioned above, the diameter of the first perforation 502 is greater than the diameter of the connecting element 52, and the diameter of the second perforation 512 is substantially equal to the diameter of the connecting element 52. Consequently, while the first outer cycloid disc 50 and the first inner cycloid disc 51 are rotated, the eccentric directions of the first outer cycloid disc 50 and the first inner cycloid disc 51 are maintained in the opposite directions and the interference between the first outer cycloid disc 50 and the first inner cycloid disc 51 is avoided. Similarly, the diameter of the third perforation 602 is equal to the diameter of the connecting element 52, and the diameter of the fourth perforation 612 is greater than the diameter of the connecting element 52. Consequently, while the second inner cycloid disc 60 and the second outer cycloid disc 61 are rotated, the eccentric directions of the second inner cycloid disc 60 and the second outer cycloid disc 61 are maintained in the opposite directions and the interference between second inner cycloid disc 60 and the second outer cycloid disc 61 is avoided.

Moreover, the first outer cycloid disc 50 comprises a first axle hole 503, and the first inner cycloid disc 51 comprises a second axle hole 513. The first axle hole 503 is located at the geometric center of the first outer cycloid disc 50. The second axle hole 513 is located at the geometric center of the first inner cycloid disc 51. A portion of the eccentric assembly 21 is rotatably disposed within the first axle hole 503 and the second axle hole 513. When the eccentric device 2 is rotated, the first outer cycloid disc 50 and the first inner cycloid disc 51 are correspondingly rotated with the eccentric assembly 21 of the eccentric device 2.

Please refer to FIG. 2F. Taking the first perforation 502 of the first outer cycloid disc 50 for example, in some embodiments, while the first outer cycloid disc 50 is mounted around a corresponding eccentric cylinder of the eccentric assembly 21 through the first axle hole 503, the eccentric cylinder is eccentrically fixed on the rotating shaft 20 so that the distance between the geometric center a of the first perforation 502 and the axle center b of the rotating shaft 20 of the eccentric assembly 21 is defined as an eccentric amount of the eccentric assembly 21 relative to the axle center b of the rotating shaft 20. i.e. an eccentric amount e of the eccentric cylinder relative to the axle center b of the rotating shaft 20. As shown in FIG. 2F, the geometric center a of the first perforation 502 is eccentrically and upwardly relative to the axle center b of the rotating shaft 20 of the eccentric assembly 21. In addition, the diameter of the first perforation 502 is greater than the diameter of the connecting element 52, the diameter of the second perforation 512 is substantially equal to the diameter of the connecting element 52, and the eccentric direction of the first outer cycloid disc 50 is opposite to the eccentric direction of the first inner cycloid disc 51. While the connecting element 52 is rotated and in contact with the inner wall of the first perforation 502, the distance between the geometric center c of the connecting element 52 and the axle center b of the rotating shaft 20 of the eccentric assembly 21 is equal to the eccentric amount e. In case that the connecting element 52 has a radius r, as shown in FIG. 2F, the radius R of the first perforation 502 is substantially equal to the sum of the radius r of the connecting element 52 and twice the eccentric amount e of the eccentric cylinder, i.e. R=r+2e. Therefore, the diameter of the first perforation 502 is substantially equal to the sum of the diameter of the connecting element 52 and four times the eccentric amount e. During the actual manufacturing process, slight deviations of sizes may be generated due to the factors such as interference or clearance, and the diameter of the first perforation 502 may cover the tolerance resulting from the deviations. In addition, since the diameter of the first perforation 502 is equal to the diameter of the fourth perforation 612, the diameter of the fourth perforation 612 is substantially equal to the sum of the diameter of the connecting element 52 and four times the eccentric amount e.

Moreover, the first inner cycloid disc 51 and the second inner cycloid disc 60 are synchronously rotated in the identical direction, and the first outer cycloid disc 50 and the second outer cycloid disc 61 are synchronously rotated in the identical direction. As shown in FIG. 2A, the connecting element 52 is a cylindrical bar. Moreover, the first perforation 502, the second perforation 512, the third perforation 602 and the fourth perforation 612 have the circular profile.

Moreover, the second inner cycloid disc 60 comprises a third axle hole 603, and the second outer cycloid disc 61 comprises a fourth axle hole 613. The third axle hole 603 is located at the geometric center of the second inner cycloid disc 60. The fourth axle hole 613 is located at the geometric center of the second outer cycloid disc 61. A portion of the eccentric assembly 21 is rotatably disposed within the third axle hole 603 and the fourth axle hole 613. When the eccentric assembly 21 is rotated, the second inner cycloid disc 60 and the second outer cycloid disc 61 are correspondingly rotated with the eccentric assembly 21 of the eccentric device 2.

In the embodiment, the first outer teeth 501 of the first outer cycloid disc 50 and the second outer teeth 511 of the first inner cycloid disc 51 of the first rotating disc assembly 5 and the first rollers 31 are collaboratively formed as the first-stage cycloid structure of the cycloid speed reducer 1. The third outer teeth 601 of the second inner cycloid disc 60 and the fourth outer teeth 611 of the second outer cycloid disc 61 of the second rotating disc assembly 6 and the second rollers 41 are collaboratively formed as the second-stage cycloid structure of the cycloid speed reducer 1. Consequently, the cycloid speed reducer 1 is a two-stage cycloid speed reducer.

From the above descriptions, the cycloid speed reducer 1 comprises two cycloid disc assemblies, i.e., the first rotating disc assembly 5 and the second rotating disc assembly 6. The first rotating disc assembly 5 comprises two cycloid discs, i.e., the first outer cycloid disc 50 and the first inner cycloid disc 51. The second rotating disc assembly 6 comprises two cycloid discs, i.e., the second inner cycloid disc 60 and the second outer cycloid disc 61. In other words, the cycloid speed reducer 1 have four cycloid discs to be in contact with the first rollers 31 of the first roller assembly 3 and the second rollers 41 of the second roller assembly 4. In comparison with the conventional cycloid speed reducer using two cycloid discs to be in contact with the rollers, the load withstood by each cycloid disc of the cycloid speed reducer 1 is reduced. Since the cycloid speed reducer 1 has stronger structural strength and higher rigidity, the cycloid speed reducer 1 can be applied to the high-load circumstance.

Moreover, the eccentric assembly 21 of the eccentric device 2 comprises a plurality of eccentric cylinders, which are eccentrically fixed on the rotating shaft 20. The plurality of eccentric cylinders are disposed within the axle holes of the corresponding cycloid discs. Due to the plurality of eccentric cylinders, the eccentric direction of two cycloid discs is opposite to the eccentric direction of the other two cycloid discs. Consequently, it is not necessary to install an additional weight compensation device in the cycloid speed reducer 1 to compensate the dynamic equilibrium. Moreover, after the connecting element 52 is penetrated through the first perforation 502, the second perforation 512, the third perforation 602 and the fourth perforation 612, the first outer cycloid disc 50, the first inner cycloid disc 51, the second inner cycloid disc 60 and the second outer cycloid disc 61 are assembled and combined together. Since the process of assembling the cycloid speed reducer 1 is simplified, the assembling time and the labor cost are reduced. In each rotating disc assembly, the diameter of the one perforation is greater than the diameter of the connecting element 52 and the diameter of the other perforation is equal to the diameter of the connecting element 52. Consequently, the eccentric directions of the two cycloid discs of each rotating disc assembly are maintained in the opposite directions and the interference between the two cycloid discs is avoided.

FIG. 2E is a schematic exploded view illustrating the relationships between the eccentric device and a bearing set in the cycloid speed reducer as shown in FIG. 2A. Please refer to FIGS. 2A, 2B, 2C, 2D and 2E. The eccentric assembly 21 is rotatably disposed within the first axle hole 503, the second axle hole 513, the third axle hole 603 and the fourth axle hole 613 through the bearing set 8. Preferably but not exclusively, the bearing set 8 comprises three independent fourth bearings 80a. The eccentric assembly 21 comprises three eccentric cylinders. As shown in FIG. 2E, the eccentric assembly 21 comprises a first eccentric cylinder 22a, a second eccentric cylinder 23a and a third eccentric cylinder 24a, which are eccentrically fixed on the rotating shaft 20 and arranged side by side. The three fourth bearings 80a are mounted around the first eccentric cylinder 22a, the second eccentric cylinder 23a and the third eccentric cylinder 24a, respectively. Consequently, the first eccentric cylinder 22a is disposed within the first axle hole 503 of the first outer cycloid disc 50 through the corresponding fourth bearing 80a. The second eccentric cylinder 23a is disposed within the second axle hole 513 of the first inner cycloid disc 51 and the third axle hole 603 of the second inner cycloid disc 60 through the corresponding fourth bearing 80a. The third eccentric cylinder 24a is disposed within the fourth axle hole 613 of the second outer cycloid disc 61 through the corresponding fourth bearing 80a. In other words, the first outer cycloid disc 50 is mounted around the first eccentric cylinder 22a, the first inner cycloid disc 51 and the second inner cycloid disc 60 are mounted around the second eccentric cylinder 23a, and the second outer cycloid disc 61 is mounted around the third eccentric cylinder 24a. The eccentric amount of the first eccentric cylinder 22a, the eccentric amount of the second eccentric cylinder 23a and the eccentric amount of the third eccentric cylinder 24a are equal. The eccentric phase of the first eccentric cylinder 22a and the eccentric phase of the third eccentric cylinder 24a are identical. That is, the eccentric direction of the first eccentric cylinder 22a and the eccentric direction of the third eccentric cylinder 24a are identical. The eccentric phase difference between the second eccentric cylinder 23a and the first eccentric cylinder 22a (or the third eccentric cylinder 24a) is 180 degrees. That is, the eccentric direction of second eccentric cylinder 23a is opposite to the eccentric direction of the first eccentric cylinder 22a (or the third eccentric cylinder 24a). In other words, the eccentric directions of the first inner cycloid disc 51 and the second inner cycloid disc 60 are opposite to the eccentric directions of the first outer cycloid disc 50 and the second outer cycloid disc 61. Consequently, it is not necessary to install an additional weight compensation device in the cycloid speed reducer 1 to compensate the dynamic equilibrium.

As mentioned above, the first outer teeth 501 of the first outer cycloid disc 50 and the second outer teeth 511 of the first inner cycloid disc 51 are in contact with the first rollers 31, and the third outer teeth 601 of the second inner cycloid disc 60 and the fourth outer teeth 611 of the second outer cycloid disc 61 are in contact with the second rollers 41. Consequently, the number of the first outer teeth 501 of the first outer cycloid disc 50 is equal to the number of the second outer teeth 511 of the first inner cycloid disc 51, and the number of the third outer teeth 601 of the second inner cycloid disc 60 is equal to the number of the fourth outer teeth 611 of the second outer cycloid disc 61. The tooth profile of the first outer teeth 501 of the first outer cycloid disc 50 matches the tooth profile of the second outer teeth 511 of the first inner cycloid disc 51, and the tooth profile of the third outer teeth 601 of the second inner cycloid disc 60 matches the tooth profile of the fourth outer teeth 611 of the second outer cycloid disc 61. Moreover, the number of the first rollers 31 is at least one more than the number of the first outer teeth 501 and at least one more than the number of the second outer teeth 511, and the number of the second rollers 41 is at least one more than the number of the third outer teeth 601 and at least one more than the number of the fourth outer teeth 611.

The operations of the cycloid speed reducer 1 will be illustrated as follows. The rotating shaft 20 receives the input power from the motor (not shown), and the rotating shaft 20 is rotated in the counterclockwise direction. As the rotating shaft 20 is rotated, the first eccentric cylinder 22a, the second eccentric cylinder 23a and the third eccentric cylinder 24a are eccentrically rotated. While the first eccentric cylinder 22a and the third eccentric cylinder 24a are eccentrically rotated, a pushing force is generated to push the slow rotation of the first outer cycloid disc 50 and the second outer cycloid disc 61 in the clockwise direction. While the second eccentric cylinder 23a is eccentrically rotated, another pushing force is generated to push the slow rotation of the first inner cycloid disc 51 and the second inner cycloid disc 60 in the counterclockwise direction. Moreover, since the first roller assembly 3 is not rotated about the axle center of the rotating shaft 20, the third outer teeth 601 of the second inner cycloid disc 60 and the fourth outer teeth 611 of the second outer cycloid disc 61 are pushed against the second rollers 41 of the second roller assembly 4. Under this circumstance, the plurality of second rollers 41 are rotated about the axle center of the rotating shaft 20 in the counterclockwise direction. Consequently, the motions of the second rollers 41 result in the counterclockwise rotation of the second wheel disc 40. In other words, the second roller assembly 4 is also rotated in the counterclockwise direction. In this embodiment, the second wheel disc 40 of the second roller assembly 4 is a power output component of the cycloid speed reducer 1 that generates the output power.

Figure 3A:
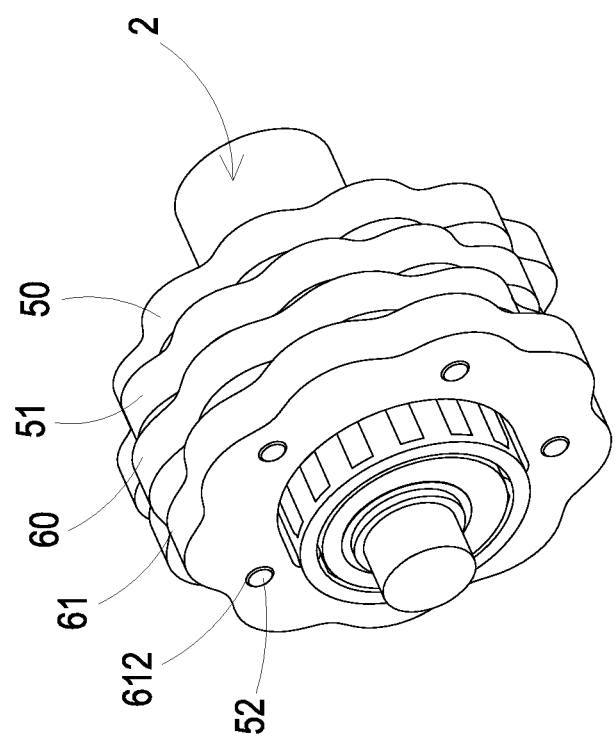
FIG. 3A is a schematic perspective view illustrating the combination of an eccentric device, a first rotating disc assembly and a second rotating disc assembly of a cycloid speed reducer according to a second embodiment of the present disclosure.
Figure 3B:
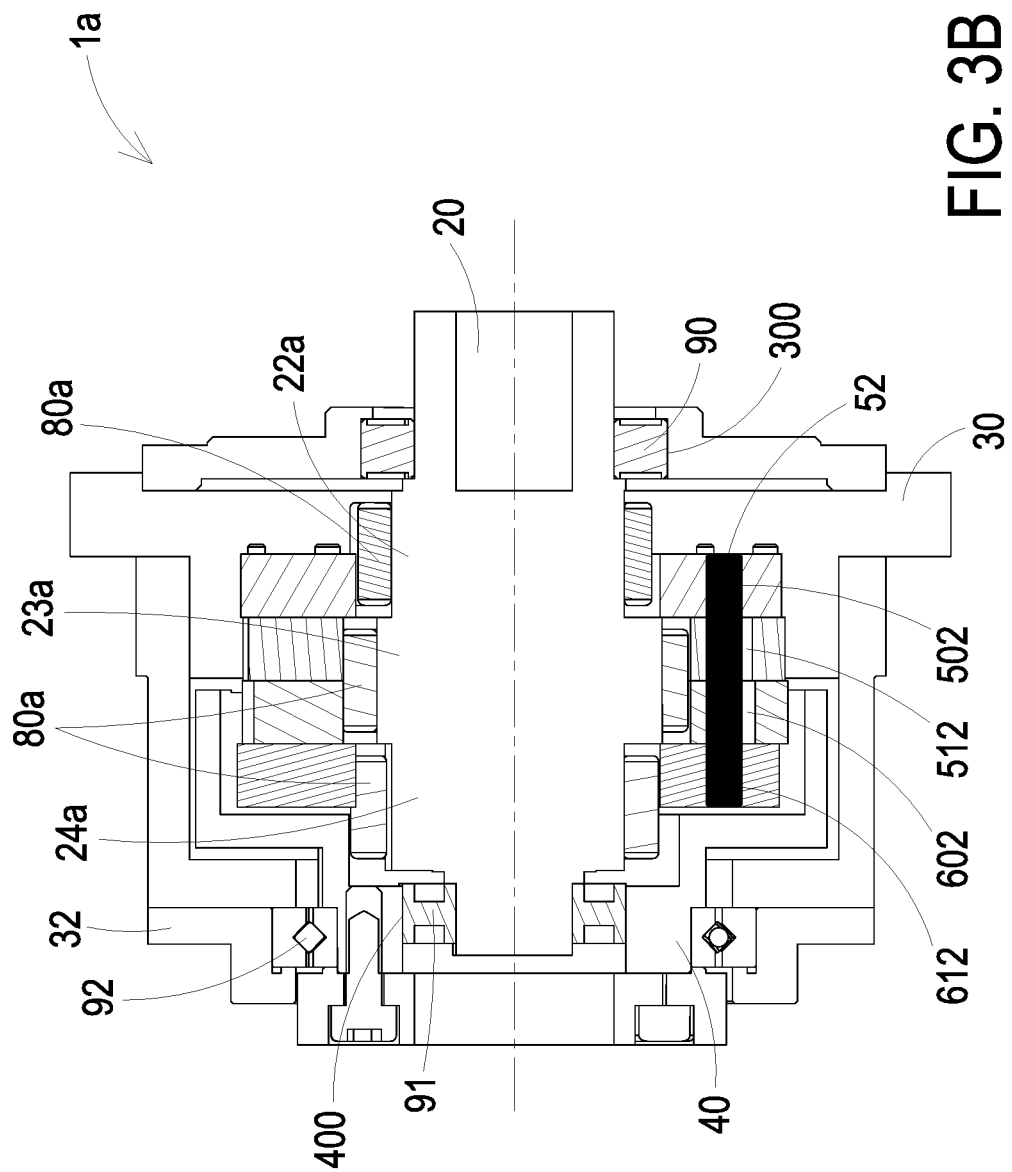
FIG. 3B is a schematic cross-sectional view illustrating the cycloid speed reducer according to the second embodiment of the present disclosure.

Please refer to FIGS. 3A and 3B. FIG. 3A is a schematic perspective view illustrating the combination of an eccentric device, a first rotating disc assembly and a second rotating disc assembly of a cycloid speed reducer according to a second embodiment of the present disclosure. FIG. 3B is a schematic cross-sectional view illustrating the cycloid speed reducer according to the second embodiment of the present disclosure. Component parts and elements corresponding to those of the first embodiment are designated by identical numeral references, and detailed descriptions thereof are omitted. In comparison with the cycloid speed reducer 1 of the first embodiment, the cycloid speed reducer 1a is also a two-stage cycloid speed reducer and the relationships between the connecting element 52 and the associated perforations 502, 512, 602 and 612 of the cycloid speed reducer 1a are distinguished. In this embodiment, the diameter of the first perforation 502 of the first outer cycloid disc 50 and the diameter of the fourth perforation 612 of the second outer cycloid disc 61 are equal to the diameter of the connecting element 52, and the diameter of the second perforation 512 of the first inner cycloid disc 51 and the diameter of the third perforation 602 of the second inner cycloid disc 60 are equal to each other and greater than the diameter of the connecting element 52. After the connecting element 52 is penetrated through the first perforation 502, the second perforation 512, the third perforation 602 and the fourth perforation 612, the first outer cycloid disc 50 and the second outer cycloid disc 61 are connected with each other through the connecting element 52. In addition, the connecting element 52 is in contact with a portion of the inner wall of the second perforation 512 and a portion of the inner wall of the third perforation 602. Preferably but not exclusively, each of the diameter of the second perforation 512 and the diameter of the third perforation 602 is substantially equal to the sum of the diameter of the connecting element 52 and four times the eccentric amount e of the eccentric assembly 21 relative to the axle center of the rotating shaft 20 (covering the tolerance resulting from the deviations).

Figure 4A:
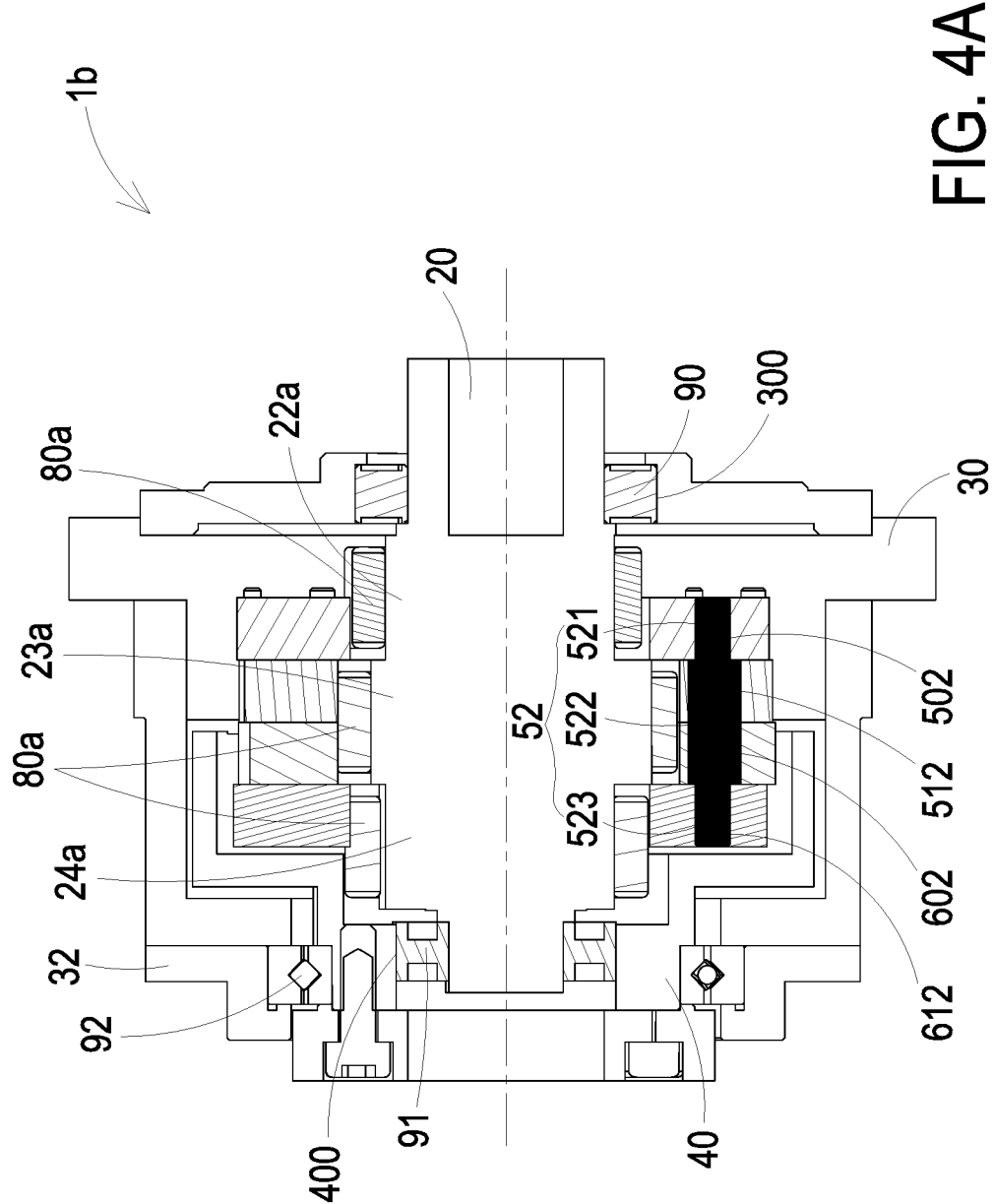
FIG. 4A is a schematic cross-sectional view illustrating a cycloid speed reducer according to a third embodiment of the present disclosure.
Figure 4B:
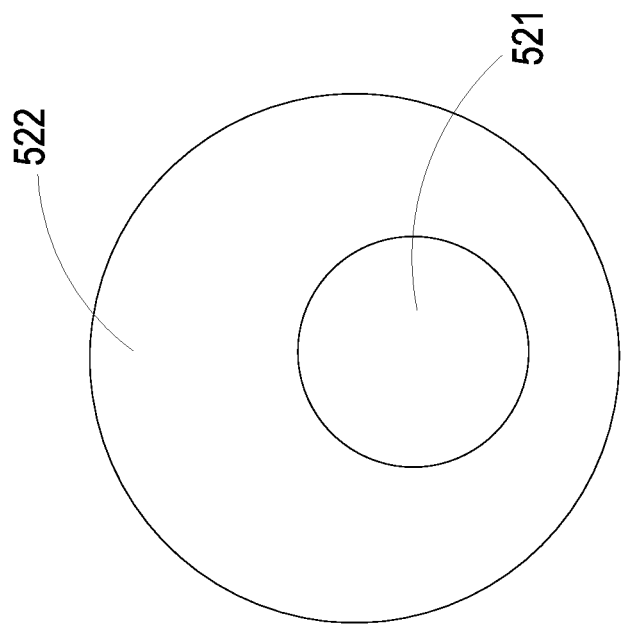
FIG. 4B is a schematic cross-sectional view illustrating the connecting element of the cycloid speed reducer according to the third embodiment of the present disclosure.

Please refer to FIGS. 4A and 4B. FIG. 4A is a schematic cross-sectional view illustrating a cycloid speed reducer according to a third embodiment of the present disclosure. FIG. 4B is a schematic cross-sectional view illustrating the connecting element of the cycloid speed reducer according to the third embodiment of the present disclosure. Component parts and elements corresponding to those of the second embodiment are designated by identical numeral references, and detailed descriptions thereof are omitted. In comparison with the cycloid speed reducer 1a of the second embodiment, the cycloid speed reducer 1b is also a two-stage cycloid speed reducer and the connecting element 52 of the cycloid speed reducer 1b of this embodiment is distinguished. Similarly, the connecting element 52 is penetrated through the first perforation 502, the second perforation 512, the third perforation 602 and the fourth perforation 612. Moreover, the connecting element 52 is in close contact with the inner walls of the first perforation 502, the second perforation 512, the third perforation 602 and the fourth perforation 612. In this embodiment, the diameter of the second perforation 512 and the diameter of the third perforation 602 are equal to each other, and the diameter of the first perforation 502 and the diameter of the fourth perforation 612 are equal to each other. Moreover, the diameter of the second perforation 512 (or the diameter of the third perforation 602) is greater than the diameter of the first perforation 502 (or the fourth perforation 612). In this embodiment, the connecting element 52 comprises a first segment 521, a second segment 522 and a third segment 523 sequentially. The first segment 521, the second segment 522 and the third segment 523 are integrally formed as a one-piece structure. The first segment 521 is accommodated within the first perforation 502. The second segment 522 is accommodated within the second perforation 512 and the third perforation 602. The third segment 523 is accommodated within the fourth perforation 612. The diameter of the first segment 521 and the diameter of the third segment 523 are equal. The diameter of the second segment 522 is greater than the diameter of the first segment 521 and the diameter of the third segment 523.

Please refer to FIG. 4B. An eccentric amount is formed between the axle center of the second segment 522 and the axle center of the first segment 521 (and the axle center of the third segment 523). Preferably, the eccentric amount between the axle center of the second segment 522 and the axle center of the first segment 521 (and the axle center of the third segment 523) is twice the eccentric amount between two adjacent eccentric cylinders of the eccentric assembly 21. In this embodiment, the diameter of the first perforation 502 is substantially equal to the diameter of the first segment 521, each of the diameters of the second perforation 512 and the third perforation 602 is substantially equal to the diameter of the second segment 522, and the diameter of the third segment 523 is substantially equal to the diameter of the fourth perforation 612. In this embodiment, the connecting element 52 is penetrated through the first perforation 502, the second perforation 512, the third perforation 602 and the fourth perforation 612. Especially, the first segment 521 of the connecting element 52 is connected with the first outer cycloid disc 50, and the entire of the first perforation 502 is filled by the first segment 521. Similarly, the second segment 522 of the connecting element 52 is connected with the first inner cycloid disc 51 and the second inner cycloid disc 60, and the entire of the second perforation 512 and the entire of the third perforation 602 are filled by the second segment 522. Similarly, the third segment 523 of the connecting element 52 is connected with the second outer cycloid disc 61, and the entire of the fourth perforation 612 is filled by the third segment 523. In other words, the first outer cycloid disc 50, the first inner cycloid disc 51, the second inner cycloid disc 60 and the second outer cycloid disc 61 are assembled and combined together through the connecting element 52.

As mentioned above, the diameter of the first perforation 502 is substantially equal to the diameter of the first segment 521, each of the diameters of the second perforation 512 and the third perforation 602 is substantially equal to the diameter of the second segment 522, and the diameter of the fourth perforation 612 is substantially equal to the diameter of the third segment 523. Consequently, after the connecting element 52 is penetrated through the first perforation 502, the second perforation 512, the third perforation 602 and the fourth perforation 612, the connecting element 52 is in close contact with the inner walls of the first perforation 502, the second perforation 512, the third perforation 602 and the fourth perforation 612. In this way, the structural strength and the rigidity of the cycloid speed reducer 1b are enhanced, and the cycloid speed reducer 1b is suitably applied to the high load circumstance. Moreover, since the eccentric amount between the axle center of the second segment 522 and the axle center of the first segment 521 (and the axle center of the third segment 523) is twice the eccentric amount between two adjacent eccentric cylinders of the eccentric assembly 21, the eccentric directions of the two cycloid discs of each rotating disc assembly are maintained in the opposite directions. Under this circumstance, the interference between the two cycloid discs is avoided.

Figure 5A:
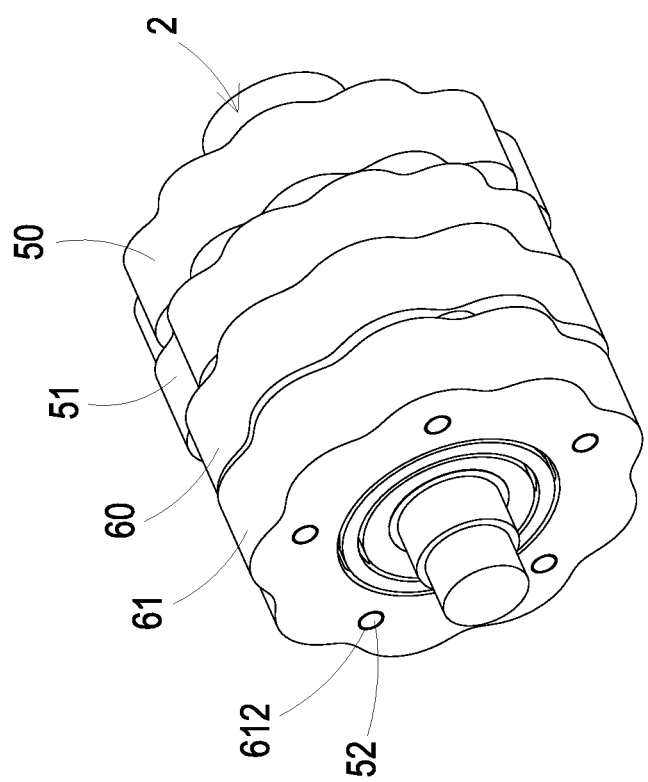
FIG. 5A is a schematic perspective view illustrating the combination of an eccentric device, a first rotating disc assembly and a second rotating disc assembly of a cycloid speed reducer according to a fourth embodiment of the present disclosure.
Figure 5B:
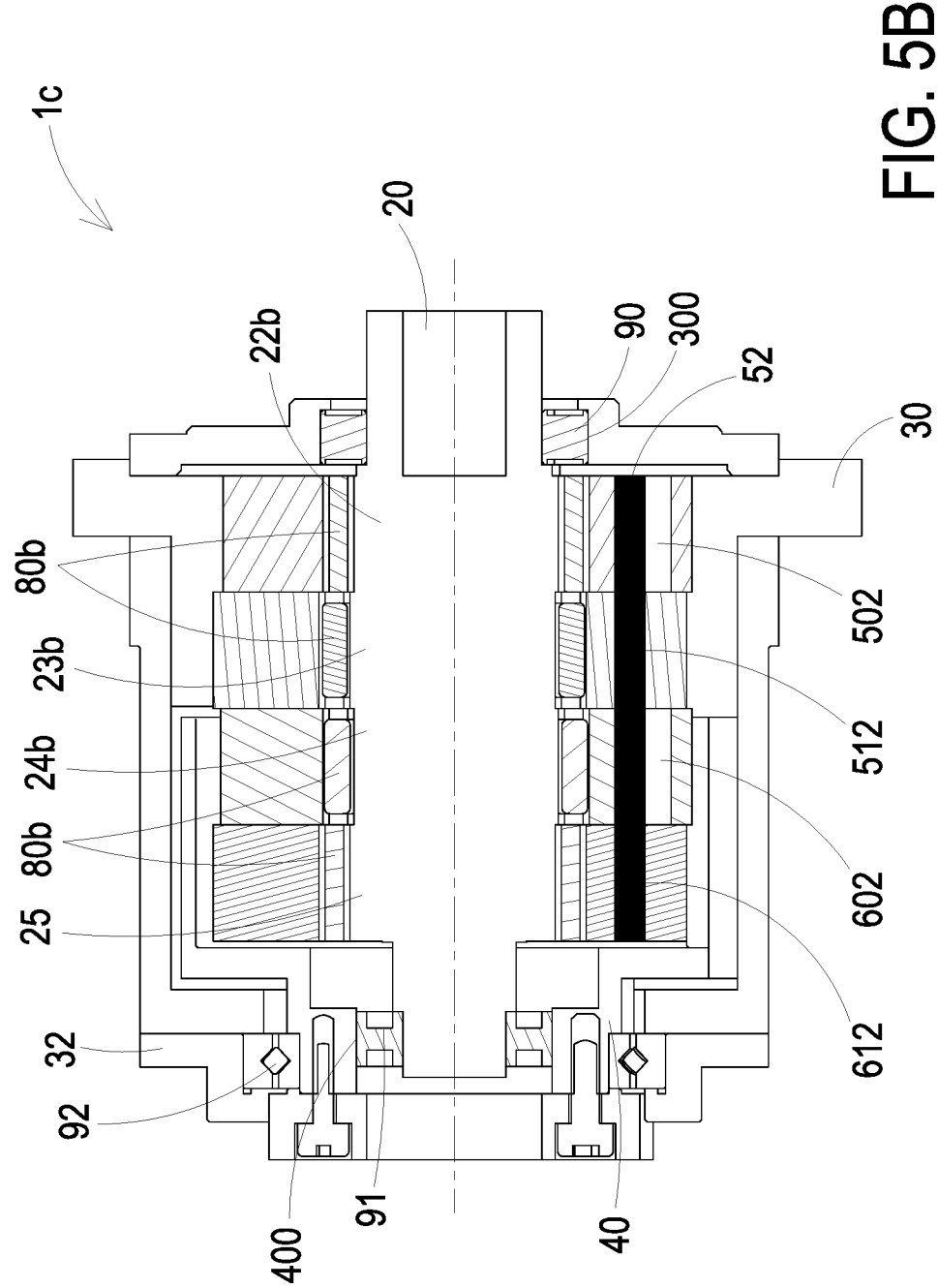
FIG. 5B is a schematic cross-sectional view illustrating the cycloid speed reducer according to the fourth embodiment of the present disclosure.
Figure 5C:
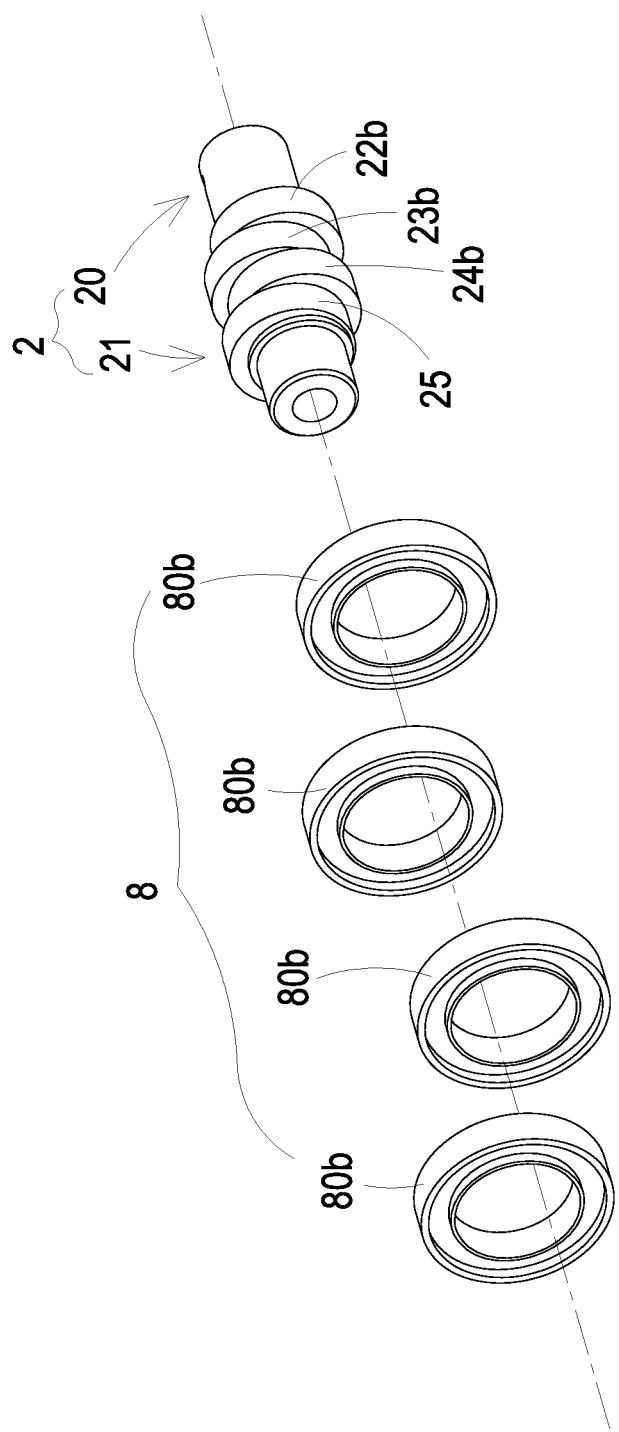
FIG. 5C is a schematic exploded view illustrating the relationships between the eccentric device and a bearing set in the cycloid speed reducer according to the fourth embodiment of the present disclosure.

Please refer to FIGS. 5A, 5B and 5C. FIG. 5A is a schematic perspective view illustrating the combination of an eccentric device, a first rotating disc assembly and a second rotating disc assembly of a cycloid speed reducer according to a fourth embodiment of the present disclosure. FIG. 5B is a schematic cross-sectional view illustrating the cycloid speed reducer according to the fourth embodiment of the present disclosure. FIG. 5C is a schematic exploded view illustrating the relationships between the eccentric device and a bearing set in the cycloid speed reducer according to the fourth embodiment of the present disclosure. Component parts and elements corresponding to those of the first embodiment are designated by identical numeral references, and detailed descriptions thereof are omitted. In comparison with the cycloid speed reducer 1 of the first embodiment, the cycloid speed reducer 1c is also a two-stage cycloid speed reducer and the relationships between the connecting element 52 and the associated perforations 502, 512, 602 and 612 of the cycloid speed reducer 1c are distinguished. In this embodiment, the diameter of the second perforation 512 and the diameter of the fourth perforation 612 are equal to the diameter of the connecting element 52, and the diameter of the first perforation 502 and the diameter of the third perforation 602 are equal to each other and greater than the diameter of the connecting element 52. After the connecting element 52 is penetrated through the first perforation 502, the second perforation 512, the third perforation 602 and the fourth perforation 612, the first inner cycloid disc 51 and the second outer cycloid disc 61 are connected with each other through the connecting element 52. In addition, the connecting element 52 is in contact with a portion of the inner wall of the first perforation 502 and a portion of the inner wall of the third perforation 602. Preferably but not exclusively, each of the diameter of the first perforation 502 and the diameter of the third perforation 602 is substantially equal to the sum of the diameter of the connecting element 52 and four times the eccentric amount e of the eccentric assembly 21 relative to the axle center of the rotating shaft 20 (covering the tolerance resulting from the deviations).

In this embodiment, the bearing set 8 comprises four independent fourth bearings 80b. The eccentric assembly 21 comprises four eccentric cylinders. As shown in FIG. 5C, the eccentric assembly 21 comprises a first eccentric cylinder 22b, a second eccentric cylinder 23b, a third eccentric cylinder 24b and a fourth eccentric cylinder 25, which are eccentrically fixed on the rotating shaft 20 and arranged side by side. The first eccentric cylinder 22b is disposed within the first axle hole 503 of the first outer cycloid disc 50 through the corresponding fourth bearing 80b. The second eccentric cylinder 23b is disposed within the second axle hole 513 of the first inner cycloid disc 51 through the corresponding fourth bearing 80b. The third eccentric cylinder 24b is disposed within the third axle hole 603 of the second inner cycloid disc 60 through the corresponding fourth bearing 80b. The fourth eccentric cylinder 25 is disposed within the fourth axle hole 613 of the second outer cycloid disc 61 through the corresponding fourth bearing 80b. In other words, the first outer cycloid disc 50 is mounted around the first eccentric cylinder 22b, the first inner cycloid disc 51 is mounted around the second eccentric cylinder 23b, the second inner cycloid disc 60 is mounted around the third eccentric cylinder 24b, and the second outer cycloid disc 61 is mounted around the fourth eccentric cylinder 25. The eccentric amount of the first eccentric cylinder 22b, the eccentric amount of the second eccentric cylinder 23b, the eccentric amount of the third eccentric cylinder 24b and the eccentric amount of the fourth eccentric cylinder 25 are equal. The eccentric phase of the first eccentric cylinder 22b and the eccentric phase of the third eccentric cylinder 24b are identical. That is, the eccentric direction of the first eccentric cylinder 22b and the eccentric direction of the third eccentric cylinder 24b are identical. The eccentric phase of the second eccentric cylinder 23b and the eccentric phase of the fourth eccentric cylinder 25 are identical. That is, the eccentric direction of the second eccentric cylinder 23b and the eccentric direction of the fourth eccentric cylinder 25 are identical. The eccentric phase difference between the second eccentric cylinder 23b (or the fourth eccentric cylinder 25) and the first eccentric cylinder 22b (or the third eccentric cylinder 24b) is 180 degrees. That is, the eccentric direction of second eccentric cylinder 23b (or the fourth eccentric cylinder 25) is opposite to the eccentric direction of the first eccentric cylinder 22b (or the third eccentric cylinder 24b). In other words, the eccentric directions of the first inner cycloid disc 51 and the second outer cycloid disc 61 are opposite to the eccentric directions of the first outer cycloid disc 50 and the second inner cycloid disc 60. Consequently, it is not necessary to install an additional weight compensation device in the cycloid speed reducer 1c to compensate the dynamic equilibrium.

Figure 6A:
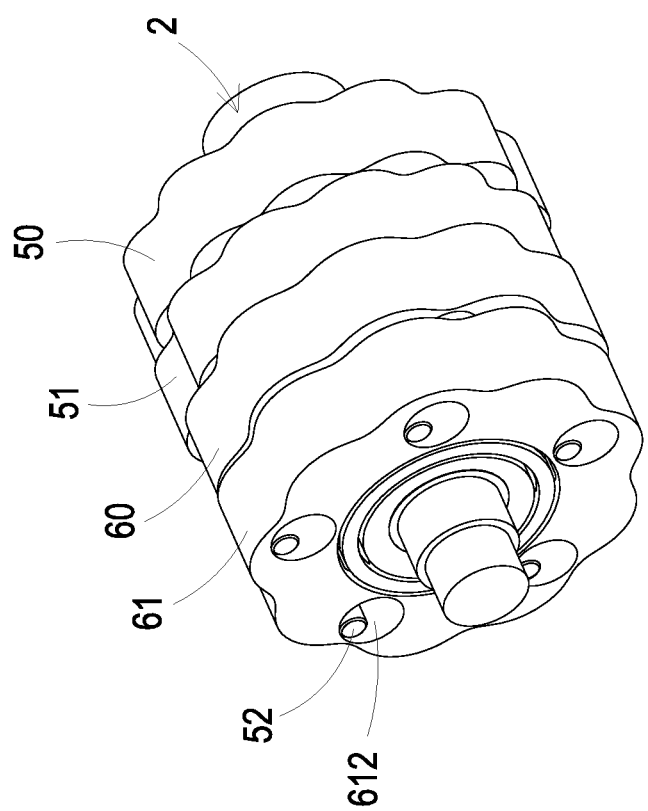
FIG. 6A is a schematic perspective view illustrating the combination of an eccentric device, a first rotating disc assembly and a second rotating disc assembly of a cycloid speed reducer according to a fifth embodiment of the present disclosure.
Figure 6B:
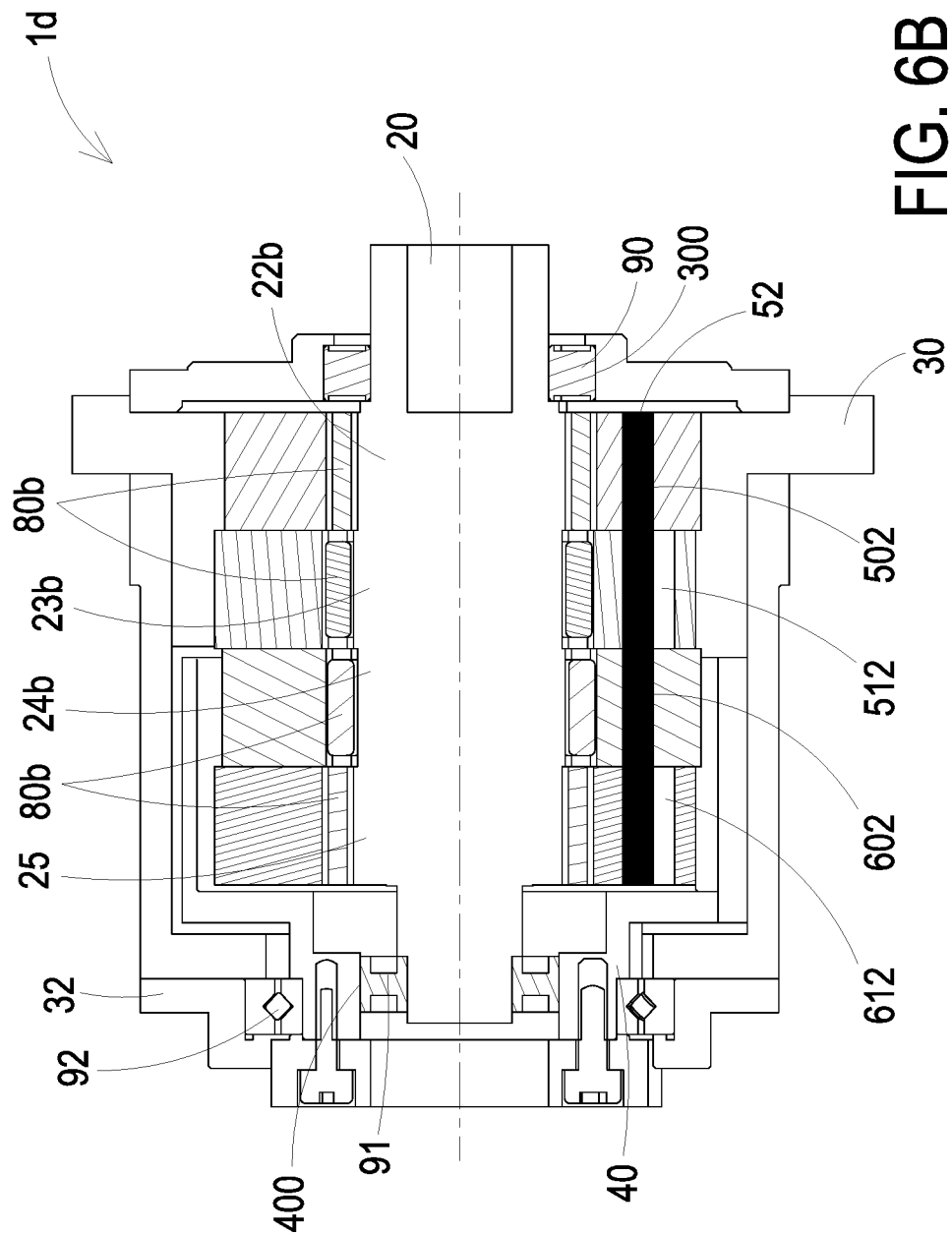
FIG. 6B is a schematic cross-sectional view illustrating the cycloid speed reducer according to the fifth embodiment of the present disclosure.

Please refer to FIGS. 6A and 6B. FIG. 6A is a schematic perspective view illustrating the combination of an eccentric device, a first rotating disc assembly and a second rotating disc assembly of a cycloid speed reducer according to a fifth embodiment of the present disclosure. FIG. 6B is a schematic cross-sectional view illustrating the cycloid speed reducer according to the fifth embodiment of the present disclosure. Component parts and elements corresponding to those of the fourth embodiment are designated by identical numeral references, and detailed descriptions thereof are omitted. In comparison with the cycloid speed reducer 1c of the fourth embodiment, the cycloid speed reducer 1d is also a two-stage cycloid speed reducer and the relationships between the connecting element 52 and the associated perforations 502, 512, 602 and 612 of the cycloid speed reducer 1d are distinguished. In this embodiment, the diameter of the first perforation 502 and the diameter of the third perforation 602 are equal to the diameter of the connecting element 52, and the diameter of the second perforation 512 and the diameter of the fourth perforation 612 are equal to each other and greater than the diameter of the connecting element 52. After the connecting element 52 is penetrated through the first perforation 502, the second perforation 512, the third perforation 602 and the fourth perforation 612, the first outer cycloid disc 50 and the second inner cycloid disc 60 are connected with each other through the connecting element 52. In addition, the connecting element 52 is in contact with a portion of the inner wall of the second perforation 512 and a portion of the inner wall of the fourth perforation 612. Preferably but not exclusively, each of the diameter of the second perforation 512 and the diameter of the fourth perforation 612 is substantially equal to the sum of the diameter of the connecting element 52 and four times the eccentric amount e of the eccentric assembly 21 relative to the axle center of the rotating shaft 20 (covering the tolerance resulting from the deviations).

From the above descriptions, the present disclosure provides a cycloid speed reducer. The cycloid speed reducer comprises two rotating disc assemblies. Each rotating disc assembly comprises two cycloid discs. In other words, the cycloid speed reducer has four cycloid discs to be in contact with the corresponding rollers. In comparison with the conventional cycloid speed reducer using two cycloid discs, the load withstood by each cycloid disc of the cycloid speed reducer of the present disclosure is reduced. Since the cycloid speed reducer has stronger structural strength and higher rigidity, the cycloid speed reducer can be applied to the high-load circumstance. Moreover, the eccentric assembly of the eccentric device comprises a plurality of eccentric cylinders. The eccentric cylinders are disposed within the axle holes of the corresponding cycloid discs. Due to the plurality of eccentric cylinders, the eccentric direction of two cycloid discs is opposite to the eccentric direction of the other two cycloid discs. Consequently, it is not necessary to install an additional weight compensation device in the cycloid speed reducer to compensate the dynamic equilibrium. Moreover, after the connecting element is penetrated through the first perforation, the second perforation, the third perforation and the fourth perforation, the first outer cycloid disc, the first inner cycloid disc, the second inner cycloid disc and the second outer cycloid disc are assembled and combined together. Since the process of assembling the cycloid speed reducer is simplified, the assembling time and the labor cost are reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cycloid speed reducer, comprising:
   an eccentric device comprising a rotating shaft and an eccentric assembly, wherein the rotating shaft is rotatable and the eccentric assembly is eccentrically fixed on the rotating shaft and arranged between a first end and a second end of the rotating shaft, wherein the eccentric assembly is driven by the rotating shaft to eccentrically rotate relative to an axle center of the rotating shaft;
   a first roller assembly comprising a first wheel disc and a plurality of first rollers, wherein the first rollers are disposed on the first wheel disc;
   a second roller assembly comprising a second wheel disc and a plurality of second rollers, wherein the second rollers are disposed on the second wheel disc;
   a first rotating disc assembly disposed on the eccentric assembly and rotated with the eccentric assembly, and comprising two cycloid discs arranged adjacent to each other, wherein each of the two cycloid discs of the first rotating disc assembly comprises at least one outer tooth and at least one perforation, and the at least one outer tooth is in contact with the corresponding first roller of the first rollers;

a second rotating disc assembly disposed on the eccentric assembly and rotated with the eccentric assembly, and comprising two cycloid discs arranged adjacent to each other, wherein each of the two cycloid discs of the second rotating disc assembly comprises at least one outer tooth and at least one perforation, and the at least one outer tooth is in contact with the corresponding second roller of the second rollers, wherein the perforations of the first rotating disc assembly and the perforations of the second rotating disc assembly are aligned with each other;

at least one connecting element penetrated through the perforations of the two cycloid discs of the first rotating disc assembly and the perforations of the two cycloid discs of the second rotating disc assembly, wherein the diameters of the portions of the connecting element penetrated through the corresponding perforations are equal to each other, wherein the diameter of the perforations of one of the two cycloid discs of the first rotating disc assembly and the diameter of the perforations of one of the two cycloid discs of the second rotating disc assembly are equal to the diameter of the connecting element, and the diameter of the perforations of the other of the two cycloid discs of the first rotating disc assembly and the diameter of the perforations of the other of the two cycloid discs of the second rotating disc assembly are greater than the diameter of the connecting element.

2. The cycloid speed reducer according to claim 1, wherein the two cycloid discs of the first rotating disc assembly comprises a first outer cycloid disc and a first inner cycloid disc, the first outer cycloid disc comprises at least one first perforation, and the first inner cycloid disc comprises at least one second perforation, wherein the two cycloid discs of the second rotating disc assembly comprises a second inner cycloid disc and a second outer cycloid disc, the second inner cycloid disc comprises at least one third perforation, and the second outer cycloid disc comprises at least one fourth perforation, wherein the diameter of the second perforation and the diameter of the third perforation are equal to the diameter of the connecting element, and the diameter of the first perforation and the diameter of the fourth perforation are greater than the diameter of the connecting element.

3. The cycloid speed reducer according to claim 1, wherein the two cycloid discs of the first rotating disc assembly comprises a first outer cycloid disc and a first inner cycloid disc, the first outer cycloid disc comprises at least one first perforation, and the first inner cycloid disc comprises at least one second perforation, wherein the two cycloid discs of the second rotating disc assembly comprises a second inner cycloid disc and a second outer cycloid disc, the second inner cycloid disc comprises at least one third perforation, and the second outer cycloid disc comprises at least one fourth perforation, wherein the diameter of the first perforation and the diameter of the fourth perforation are equal to the diameter of the connecting element, and the diameter of the second perforation and the diameter of the third perforation are greater than the diameter of the connecting element.

4. The cycloid speed reducer according to claim 1, wherein the two cycloid discs of the first rotating disc assembly comprises a first outer cycloid disc and a first inner cycloid disc, the first outer cycloid disc comprises at least one first perforation, and the first inner cycloid disc comprises at least one second perforation, wherein the two cycloid discs of the second rotating disc assembly comprises a second inner cycloid disc and a second outer cycloid disc, the second inner cycloid disc comprises at least one third perforation, and the second outer cycloid disc comprises at least one fourth perforation, wherein the diameter of the second perforation and the diameter of the fourth perforation are equal to the diameter of the connecting element, and the diameter of the first perforation and the diameter of the third perforation are greater than the diameter of the connecting element.

5. The cycloid speed reducer according to claim 1, wherein the two cycloid discs of the first rotating disc assembly comprises a first outer cycloid disc and a first inner cycloid disc, the first outer cycloid disc comprises at least one first perforation, and the first inner cycloid disc comprises at least one second perforation, wherein the two cycloid discs of the second rotating disc assembly comprises a second inner cycloid disc and a second outer cycloid disc, the second inner cycloid disc comprises at least one third perforation, and the second outer cycloid disc comprises at least one fourth perforation, wherein the diameter of the first perforation and the diameter of the third perforation are equal to the diameter of the connecting element, and the diameter of the second perforation and the diameter of the fourth perforation are greater than the diameter of the connecting element.

6. The cycloid speed reducer according to claim 1, wherein the diameter of the other of the perforations of the two cycloid discs of the first rotating disc assembly is equal to the sum of the diameter of the connecting element and four times the eccentric amount of the eccentric assembly relative to the axle center of the rotating shaft, wherein the diameter of the other of the perforations of the two cycloid discs of the second rotating disc assembly is equal to the sum of the diameter of the connecting element and four times the eccentric amount of the eccentric assembly relative to the axle center of the rotating shaft.

7. The cycloid speed reducer according to claim 1, wherein the two cycloid discs of the first rotating disc assembly have opposite eccentric directions, and the two cycloid discs of the second rotating disc assembly have opposite eccentric directions.

8. A cycloid speed reducer, comprising:
an eccentric device comprising a rotating shaft and an eccentric assembly, wherein the rotating shaft is rotatable and the eccentric assembly is eccentrically fixed on the rotating shaft and arranged between a first end and a second end of the rotating shaft, wherein the eccentric assembly is driven by the rotating shaft to eccentrically rotate relative to an axle center of the rotating shaft;
a first roller assembly comprising a first wheel disc and a plurality of first rollers, wherein the first rollers are disposed on the first wheel disc;
a second roller assembly comprising a second wheel disc and a plurality of second rollers, wherein the second rollers are disposed on the second wheel disc;
a first rotating disc assembly disposed on the eccentric assembly and rotated with the eccentric assembly, and comprising a first outer cycloid disc and a first inner cycloid disc, wherein the first outer cycloid disc and the first inner cycloid disc are arranged adjacent to each other, the first outer cycloid disc comprises at least one first outer tooth and at least one first perforation, the first inner cycloid disc comprises at least one second outer tooth and at least one second perforation, and the at least one first outer tooth and the at least one second outer tooth are in contact with the corresponding first roller of the first rollers, respectively;

a second rotating disc assembly disposed on the eccentric assembly and rotated with the eccentric assembly, and comprising a second inner cycloid disc and a second outer cycloid disc, wherein the second inner cycloid disc and the second outer cycloid disc are arranged adjacent to each other, the second inner cycloid disc comprises at least one third outer tooth and at least one third perforation, the second outer cycloid disc comprises at least one fourth outer tooth and at least one fourth perforation, and the at least one third outer tooth and the at least one fourth outer tooth are in contact with the corresponding second roller of the second rollers, respectively, wherein the at least one first perforation, the corresponding second perforation, the corresponding third perforation and the corresponding fourth perforation are aligned with each other; and at least one connecting element penetrated through the at least one first perforation, the corresponding second perforation, the corresponding third perforation and the corresponding fourth perforation, wherein the at least one connecting element is in close contact with inner walls of the at least one first perforation, the corresponding second perforation, the corresponding third perforation and the corresponding fourth perforation, wherein the diameter of the second perforation and the diameter of the third perforation are equal to each other, the diameter of the first perforation and the diameter of the fourth perforation are equal to each other, and the diameter of the second perforation and the diameter of the third perforation are greater than the diameter of the first perforation and the fourth perforation.

9. The cycloid speed reducer according to claim 8, wherein the connecting element comprises a first segment, a second segment and a third segment sequentially, wherein the first segment is accommodated within the corresponding first perforation, the second segment is accommodated within the corresponding second perforation and the corresponding third perforation, and the third segment is accommodated within the corresponding fourth perforation.

10. The cycloid speed reducer according to claim 9, wherein an eccentric amount is formed between an axle center of the second segment and an axle center of the first segment and the third segment.

11. The cycloid speed reducer according to claim 10, wherein an eccentric amount formed between the first outer cycloid disc and the first inner cycloid disc is equal to an eccentric amount formed between the second inner cycloid disc and the second outer cycloid disc, wherein the eccentric amount formed between the axle center of the second segment and the axle center of the first segment and the third segment is twice the eccentric amount formed between the first outer cycloid disc and the first inner cycloid disc.

12. The cycloid speed reducer according to claim 8, wherein the first outer cycloid disc and the first inner cycloid disc have opposite eccentric directions, and the second outer cycloid disc and the second inner cycloid disc have opposite eccentric directions.

* * * * *